(12) United States Patent
Usami et al.

(10) Patent No.: US 6,992,412 B2
(45) Date of Patent: Jan. 31, 2006

(54) ROTARY ELECTRIC MACHINE HAVING LAMINATED ARMATURE CORE

(75) Inventors: Shinji Usami, Okazaki (JP); Masami Niimi, Handa (JP); Tsutomu Shiga, Nukata-gun (JP); Masanori Ohmi, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/809,367

(22) Filed: Mar. 26, 2004

(65) Prior Publication Data

US 2004/0222714 A1    Nov. 11, 2004

(30) Foreign Application Priority Data

May 7, 2003   (JP)   ............................. 2003-129361

(51) Int. Cl.
```
H02K 7/10       (2006.01)
H02K 9/08       (2006.01)
H02K 13/00      (2006.01)
H02K 1/32       (2006.01)
```
(52) U.S. Cl. ...................... 310/61; 310/60 A; 310/216; 310/217
(58) Field of Classification Search ................ 310/216, 310/217, 58, 59, 60 R; 36/61, 60 A, 201
See application file for complete search history.

(56) References Cited

U.S. PATENT DOCUMENTS

| | | | | |
|---|---|---|---|---|
| 4,489,249 A | * | 12/1984 | Olivier ....................... | 310/216 |
| 4,833,769 A | * | 5/1989 | Tomite et al. ................. | 29/597 |
| 5,650,683 A | * | 7/1997 | Shiga et al. ................. | 310/201 |
| 5,986,366 A | * | 11/1999 | Bailey et al. ................. | 310/52 |
| 6,700,287 B2 | * | 3/2004 | Ohmura et al. ............. | 310/217 |
| 2002/0079778 A1 | | 6/2002 | Ohmura et al. | |

FOREIGN PATENT DOCUMENTS

JP    A 8-214481    8/1996

OTHER PUBLICATIONS

U.S. Appl. No. 10/706,930, filed, Nov. 24, 2003, Niimi et al.

* cited by examiner

*Primary Examiner*—Tran Nguyen
(74) *Attorney, Agent, or Firm*—Oliff & Berridge, PLC

(57) ABSTRACT

An armature composed of a shaft and an armature core is rotatably supported in a housing of a rotary electric machine. The shaft is forcibly inserted into a center hole of the armature core formed by laminating core sheets. Each core sheet has a center hole and outer holes connected to the center hole. A contour of the center hole is not continuous because the outer holes are connected thereto. The shaft can be firmly connected to the laminated core sheets with a relatively low inserting force. The shaft has a smooth outer surface having no knurls or the like. In addition, the outer holes of the laminated core sheets form cooling air passages in the armature core in its axial direction.

9 Claims, 3 Drawing Sheets

FRONT SIDE ←→ REAR SIDE

ROTARY ELECTRIC MACHINE HAVING LAMINATED ARMATURE CORE

CROSS-REFERENCE TO RELATED APPLICATION

This application is based upon and claims benefit of priority of Japanese Patent Application No. 2003-129361 filed on May 7, 2003, the content of which is incorporated herein by reference.

BACKGROUND OF THE INVENTION

1. Field of the Invention

The present invention relates to a rotary electric machine such as a starter motor that has a laminated armature core fixed to a rotatable center shaft.

2. Description of Related Art

An example of a rotary electric machine having a laminated armature core fixed to a rotatable center shaft is shown in JP-A-8-214481 or JP-A-2002-199626. The armature core disclosed therein is formed by laminating core sheets, each having a center hole, and by forcibly inserting a center shaft into the center holes of the laminated core sheets.

The following problem is involved in the conventional structure of the armature core. That is, a large amount of force is required to forcibly insert the center shaft into the center hole because the center hole is a continuous round hole. It is possible to reduce the inserting force by enlarging the diameter of the center hole (i.e., by reducing an amount of the diameter to be enlarged by forcibly inserting the center shaft). However, if the diameter of the center hole is enlarged too much, the laminated core sheets would not be firmly connected to the center shaft. Alternatively, knurls may be formed on the center shaft to firmly connect the center shaft to the laminated core sheets. However in this case, it is necessary to precisely control the diameter of the center hole, resulting in an increase in the manufacturing costs.

SUMMARY OF THE INVENTION

The present invention has been made in view of the above-mentioned problem, and an object of the present invention is to provide an improved rotary electric machine, in which laminated armature core sheets are firmly connected to a center shaft without increasing manufacturing costs.

The rotary electric machine is composed of a housing forming a magnetic field therein and an armature rotatably supported in the housing. The armature includes an armature core formed by laminating core sheets and a shaft connected to the armature core by forcibly inserting the shaft into a center hole of the armature core. Slots for disposing conductor segments therein are formed on the outer periphery of the armature core.

Each core sheet is stamped out from a steel plate, and a center hole and outer holes connected to the center hole are simultaneously formed. Core sheets forming one armature core are divided into three blocks. Core sheets in each block are laminated so that the outer holes are aligned straight in the axial direction. The three blocks are laminated so that the angular positions of the outer holes around the axial direction are shifted by a predetermined angle block by block, thereby forming air passages through the armature core in the axial direction. The air passages are skewed relative to the axial direction. The predetermined sifting angle is preferably set to an angle corresponding to one slot pitch.

Since the contour of the center hole is not continuous but separated by the outer holes connected thereto, an amount of deformation of the center hole caused by forcibly inserting the shaft into the center hole can be made relatively large. Therefore, the shaft can be inserted by a relatively small amount of force and can be firmly connected to the laminated armature core. It is not necessary to form knurls or the like on the shaft, and therefore, there is no need to precisely control the diameter of the center hole. Thus, the armature can be manufactured at a low cost. Further, since the air passages are formed through the armature core, the rotary electric machine is effectively cooled. By skewing the air passages relative to the axial direction, cooling efficiency is further improved.

The core sheets may be laminated without dividing into blocks. The air passages may be made without making the skew relative to the axial direction. Each conductor segment disposed in the slot may be formed to include a coil end bent from an in-slot portion at a right angle. The coil ends are circularly arranged on an axial end surface of the armature core, thereby forming a commutator surface. Brush powder generated by abrasion is effectively exhausted through the air passages formed through the armature core.

Other objects and features of the present invention will become more readily apparent from a better understanding of the preferred embodiment described below with reference to the following drawings.

DETAILED DESCRIPTION OF THE PREFERRED EMBODIMENT

Figure 3:
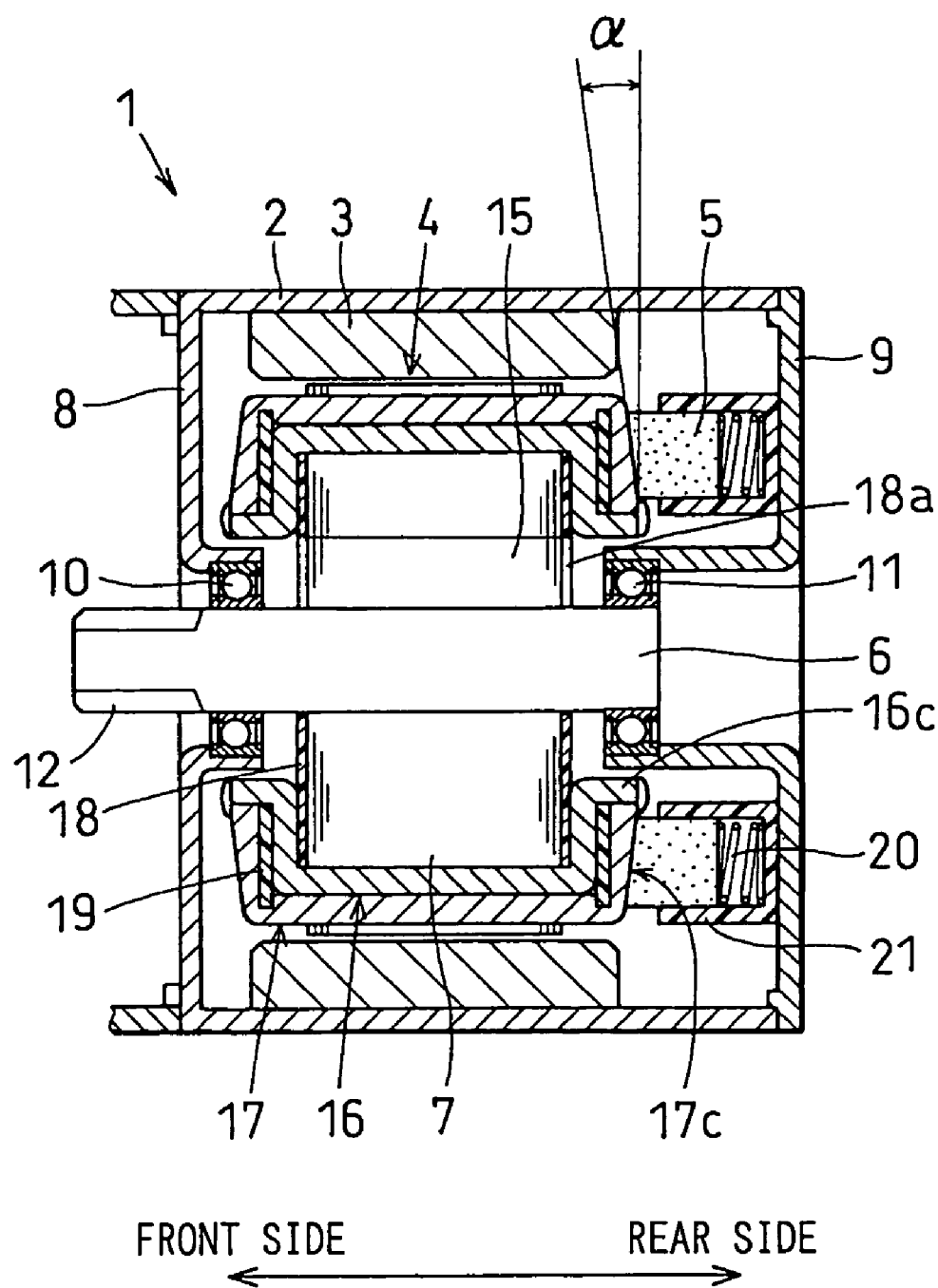
FIG. 3 is a cross-sectional view showing a rotary electric machine according to the present invention.

A preferred embodiment of the present invention will be described with reference to accompanying drawings. A rotary electric machine according to the present invention is used, for example, as a starter motor for cranking an internal combustion engine. As shown in FIG. 3, the starter motor 1 is composed of: a housing constituted by a cylindrical yoke 2 having a front end wall 8 and a rear end frame 9; stator poles 3 (permanent magnets) fixed to the inner bore of the yoke 2; an armature 4 rotatably supported in the housing; brushes 5 for supplying electric current to the armature 4 from an on-board battery; and other associated components.

The armature 4 is composed of a shaft 6, an armature core 7 fixed to the shaft 6, conductor segments disposed in the armature core 7, and a commutator formed by coil ends of the conductor segments. The shaft 6 rotataby supported in the housing by a front bearing 10 fixed to the front end wall 8 and a rear bearing 11 fixed to the rear end frame 9. A sun gear 12 for constituting a planetary gear reduction mechanism (not shown) is formed at the front end of the shaft 6.

Figure 1:
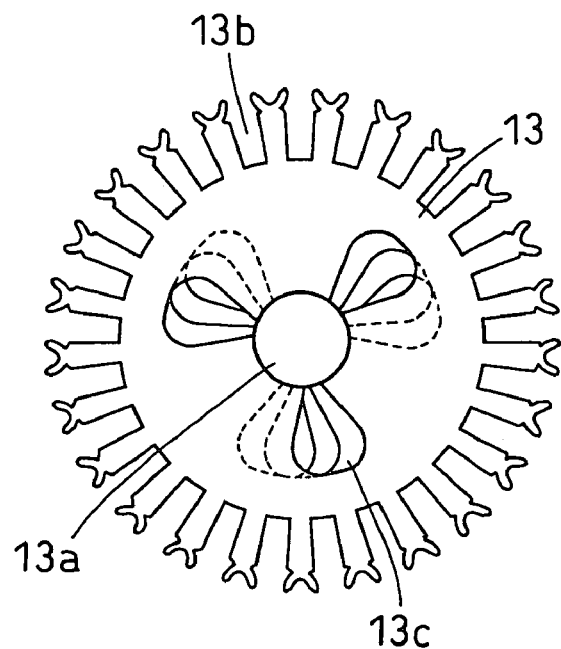
FIG. 1 is a plan view showing an armature core, viewed from an axial end of the armature core.
Figure 2:
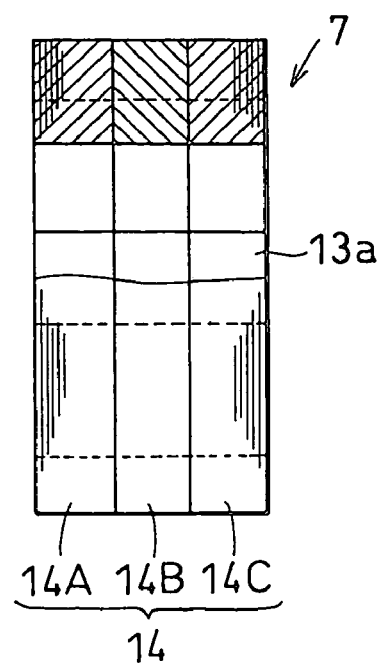
FIG. 2 is a side view (partially cross-sectioned) showing laminated armature core sheets.

As shown in FIG. 2, the armature core 7 is composed of three core sheet blocks 14 consisting of respective core sheet blocks 14A, 14B and 14C. Each sheet block 14A–14C is formed by laminating core sheets 13 shown in FIG. 1. The core sheet 13 is stamped out from a thin steel plate. The core sheet 13 has a center hole 13*a* at its center, slots 13*b* on its outer periphery. The slots 13*b* are formed at an equal interval, which is referred to as a slot pitch. Outer holes 13*c* connected to (or opened to) the center hole 13*a* are also formed at an equal interval as shown in FIG. 1. Therefore, the center hole 13*a* does not have a continuous contour but a contour intercepted by outer holes 13*c* which are connected to the center hole 13*a*.

Figure 4:
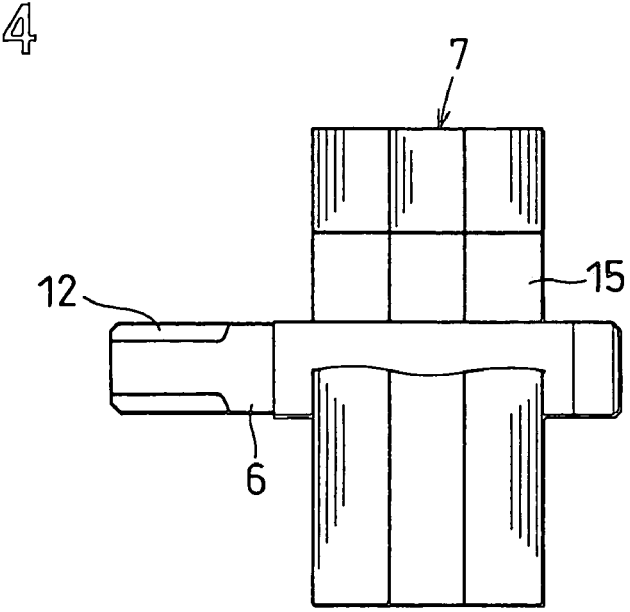
FIG. 4 is a side view (partially cross-sectioned) showing the armature core with a center shaft.

A certain number of stamped core sheets 13 are laminated so that the outer holes 13*c* are aligned straight in the axial direction, thereby forming each core sheet block 14A–14C. The core sheet block 14B is laminated on the core sheet block 14A so that the outer holes 13*c* of the core sheet block 14B are shifted from those of the core sheet block 14A by a predetermined angle e.g., an angle corresponding to one slot pitch. The core sheet block 14C is laminated on the core sheet block 14B in the same manner so that the outer holes 13*c* of the core sheet block 14C are shifted from those of the core sheet block 14B by the same predetermined angle. The shaft 6 is forcibly inserted into the center holes 13*a* of the laminated core sheet blocks 14. In this manner, air passages 15 (shown in FIG. 4) are formed through the armature core 7 in its axial direction. The air passages 15, however, do not extend in parallel to the shaft 6 but are skewed because the outer holes of each core sheet block 14A–14C are shifted from one another by an predetermined angle, e.g., by one slot pitch. The shaft 6 which is forcibly inserted into the center hole 13 has a smooth surface, i.e., no knurl or the like is formed on the outer surface.

Figure 5:
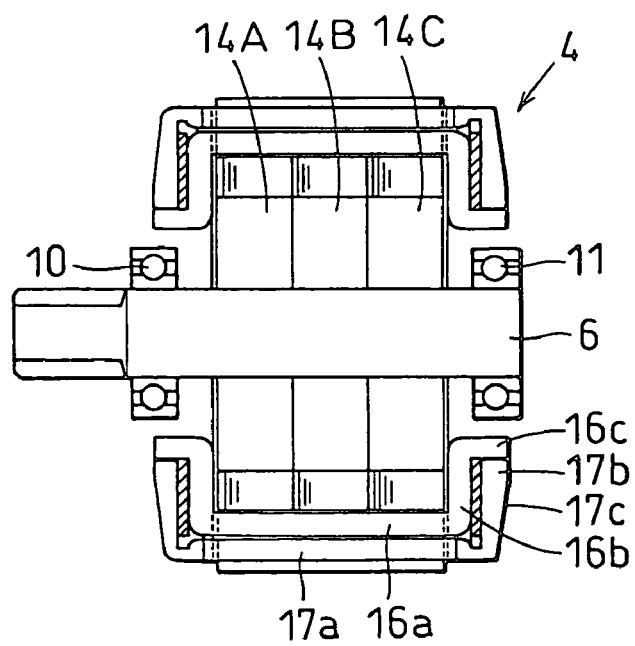
FIG. 5 is a cross-sectional view showing an armature according to the present invention.

As shown in FIGS. 3 and 5, an inner conductor segment 16 and an outer conductor segment 17 are disposed in each slot 13*b*. The inner conductor segment 16 has an in-slot portion 16*a* disposed in the slot 13*b* and a pair of coil ends 16*b* which are bent at a right angle from the in-slot portion 16*a* and disposed on axial end surfaces of the armature core 7. Similarly, the outer conductor segment 17 has an in-slot portion 17*a* and a pair of coil ends 17*b*. The coil end 16*b* has a projected portion 16*c* extending in the axial direction. The projected portion 16*c* of the inner conductor segment 16 is electrically connected to a tip of the coil end 17*b* of the outer conductor segment 17. In this manner, an armature coil disposed in the slots 13*b* is formed.

As shown in FIG. 3, an insulating plate 18 having holes 18*a* corresponding to the air passages 15 is disposed between the axial end surface of the armature core 7 and the inner conductor 16. Both of the front end surface and the rear end surface of the armature core 7 are insulated from the inner conductors 16 in the same manner. Another insulating plate 19 is disposed between the inner conductor segment 16 and the outer conductor segment 17 at each axial end of the armature core 7.

The coil ends 17*b* of the outer conductor segment 17 are formed so that its thickness is gradually increased from the outside of the armature core 7 toward the inside thereof, as shown in FIGS. 3 and 5, thereby making a slant angle α shown in FIG. 3. The cross-sectional area of the coil end 17*b* is made uniform throughout its entire length by gradually narrowing its width from the outside toward the inside. The coil ends 17*b* form a commutator surface 17*c* by circularly arranging the coil ends 17*b* on the rear end surface of the armature 7.

As shown in FIG. 3, brushes 5 made of, e.g., a copper material, contact the commutator surface 17*c*. The brushes 5 are biased toward the commutator surface 17*c* by brush springs 20. The brush 5 and the brush spring 20 are held in a brush holder 21 which is fixedly connected to the rear end frame 9. The tip surface of the brush 5 is slanted by the slant angle α to realize a smooth contact between the brush 5 and the commutator surface 17*c*.

The following advantages are obtained according to the present invention. Since the outer holes 13*c* connected to the center hole 13*a* are formed on the core sheet 13, the contour of the center hole 13*a* is not continuous but separated by the outer holes 13*c*. Therefore, when the center hole 13*a* is enlarged and deformed by forcibly inserting the shaft 6, some core sheet material escapes into the outer holes 13*c*. Accordingly, a force required for inserting the shaft 6 into the center hole 13*a* of the armature core 7 is reduced, compared with the conventional structure in which the center hole 13*a* is made continuous. The armature core 7 can be firmly connected to the shaft 6 with a relatively low inserting force. Further, it is not required to form knurls on the shaft 6 to firmly connect the armature core 7 to the shaft 6. Therefore, it is not necessary to form the center hole 13*a* with a high precision. Thus, the manufacturing costs can be reduced.

Since the air passages 15 are formed in the armature core 7 by the outer holes 13*c*, the armature 4 is effectively cooled by the air flowing through the air passages 15. Therefore, the rotary electric machine 1 can be operated at a high speed. Further, the air passages 15 are not parallel to the axial direction but they are skewed. By making the skew direction match the direction of airflow generated by rotation of the armature 4, air resistance in the air passages 15 can be reduced, and thereby cooling efficiency can be further improved.

Brush powder generated by abrasion between the brushes 5 and the commuator surface 17*c* can be carried out through the air passages 15 formed through the armature core 7. Accordingly, adhesion of the brush power to the commutator surface 17*c* is effectively avoided. Thus, the operating life of the brushes 5 is improved.

The present invention is not limited to the embodiment described above, but it may be variously modified. For example, three core sheet blocks 14A–14C may be laminated without shifting the positions of outer holes 13*c*. In this case, the air passages 15 are formed in parallel to the axial direction without making the skew relative to the axial direction. The core sheets 13 may be laminated without dividing into core sheet blocks. In this case, all the core sheets 13 may be laminated without shifting the angular positions of the outer holes 13*c*, forming the straight air passages 15 through the armature core 7. Alternatively, the core sheets 13 may be laminated by shifting the angular positions of the outer holes 13*c* sheet by sheet, forming the skewed air passages 15.

In shifting the angular positions of the outer holes 13*c*, block by block or sheet by sheet, an amount of the shift is set to one slot pitch, or an integer number of times of the slot pitch. In this manner, the slots 13*b* formed on the outer surface of the armature core 7 extend straight in the axial direction. Therefore, the in-slot portions 16*a*, 17*a* of both conductor segments 16, 17 are easily disposed in the slots 13*b*.

Further, the core sheets 13 having the center hole 13*a* and the outer holes 13*c* may be laminated without aligning angular positions of the outer holes 13*c*. In this case, the air passages 15 are not formed, but the force inserting the shaft 6 into the center hole 13*a* can be reduced.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A rotary electric machine, comprising:
a housing; and
an armature having a shaft rotatably supported in the housing and an armature core fixedly connected to the shaft, wherein:
the armature core is formed by laminating a plurality of core sheets, each core sheet having a center hole and outer holes connected to the center hole with no intervening material therebetween wherein the core sheets are laminated so that the outer holes of the core sheets communicate with one another, thereby forming air passages in the armature core in the axial direction thereof, and the laminated core sheets are divided into a predetermined number of blocks; and the outer holes of the core sheets are positioned at a same position in each block and are shifted block by block by a predetermined angle around the axial direction, thereby forming air passages skewed block by block relative to the axial direction in the armature core.

2. The rotary electric machine as in claim 1, wherein:
the core sheets are laminated so that the outer holes of the core sheets are positioned in a shifted relation to one another by a predetermined angle around the axial direction, thereby forming air passages skewed relative to the axial direction.

3. The rotary electric machine as in claim 2, wherein:
the plurality of core sheets are laminated by dividing the same into a few blocks.

4. The rotary electric machine as in claim 2, wherein:
the predetermined angle is an angle corresponding to one slot pitch.

5. The rotary electric machine as in claim 1, wherein:
the predetermined angle is an angle corresponding to one slot pitch.

6. The rotary electric machine as in claim 1, wherein:
the armature further having conductor segments, each conductor segment including an in-slot portion disposed in a slot formed on an outer periphery of the armature core and a coil end bent from the in-slot portion and disposed on an axial end surface of the armature core; and
the coil ends of the conductor segments are circularly arranged on the axial end surface of the armature core, thereby forming a commutator surface that contacts brushes.

7. The rotary electric machine as in claim 1, wherein:
the armature further having conductor segments, each conductor segment including an in-slot portion disposed in a slot formed on an outer periphery of the armature core and a coil end bent from the in-slot portion and disposed on an axial end surface of the armature core; and
the coil ends of the conductor segments are circularly arranged on the axial end surface of the armature core, thereby forming a commutator surface that contacts brushes.

8. A rotary electric machine, comprising:
a housing; and
an armature having a shaft rotatably supported in the housing and an armature core fixedly connected to the shaft, wherein:
the armature core is formed by laminating a plurality of core sheets, each sheet having a center hole and outer holes connected to the center hole, the laminated core sheets being divided into a predetermined number of blocks, the outer holes of the core sheets being positioned at a same position in each block and shifted block by block by a predetermined angle around the axial direction, thereby forming air passages skewed block by block relative to the axial direction in the armature core; and
the armature core is connected to the shaft by forcibly inserting the shaft into the center holes of the laminated core sheets.

9. The rotary electric machine as in claim 1, wherein an outer surface of the shaft contacting the center holes of the laminated core sheets has no knurls.

* * * * *